United States Patent

Vandor

[11] 4,053,549
[45] Oct. 11, 1977

[54] METHOD OF EMBOSSING FOAM POLYSTYRENE TO PREVENT WARPING UPON REMOVAL FROM MOLD

[75] Inventor: Robert Joseph Vandor, Canandaigua, N.Y.

[73] Assignee: Mobil Oil Corporation, New York, N.Y.

[21] Appl. No.: 538,660

[22] Filed: Jan. 6, 1975

[51] Int. Cl.² .......................... B29B 3/00; B29F 5/00
[52] U.S. Cl. .................................. 264/293; 264/296; 264/321
[58] Field of Search ............... 264/321, 322, 293, 92, 264/93, 294, 296; 425/383, 385, 335, DIG. 235; 229/2.5, 3.5 R

[56] References Cited

U.S. PATENT DOCUMENTS

| | | | |
|---|---|---|---|
| 2,259,687 | 10/1941 | Fisch | 425/335 |
| 2,681,377 | 6/1954 | Smithers | 264/321 |
| 2,958,148 | 11/1960 | Sylvester et al. | 264/293 |
| 2,988,456 | 11/1970 | Kantor | 264/1 |
| 3,155,303 | 11/1964 | Fenkel | 229/2.5 |
| 3,170,974 | 2/1965 | Jacobs | 264/321 |
| 3,261,531 | 7/1966 | Barth | 229/2.5 |
| 3,381,076 | 4/1968 | Govatsos | 264/321 |
| 3,450,326 | 6/1969 | Foote | 264/321 |
| 3,537,928 | 11/1970 | Maglio et al. | 156/79 |
| 3,542,453 | 6/1961 | Fairbanks et al. | 264/1 |
| 3,567,067 | 2/1971 | Weiss | 229/2.5 |
| 3,608,143 | 9/1971 | Schutz | 229/2.5 |
| 3,640,668 | 2/1972 | Brown et al. | 264/321 |
| 3,881,980 | 5/1975 | Olson | 264/321 |
| 3,901,962 | 8/1975 | Kuchuris et al. | 264/321 |
| 3,917,770 | 11/1975 | Jackson | 264/322 |

OTHER PUBLICATIONS

Dorian, "Six-Language Dictionary of Plastics...", Iliffe Books, London, 1965, p. 582.

*Primary Examiner*—Willard E. Hoag
*Attorney, Agent, or Firm*—Charles A. Huggett; James D. Tierney

[57] ABSTRACT

A method is provided for thermoforming thermoplastic foam articles whereby the tendency for such articles to deform and/or warp immediately upon release from the thermoforming device is eliminated. The method includes the formation of parallel or concentric grooves on one surface of the article during the course of the thermoforming operation. Such grooves eliminate the pronounced tendency of thermoformed articles to curl up following their removal from the thermoforming mold and maintains the formed piece in the desired flat configuration.

3 Claims, 10 Drawing Figures

FIG. 9
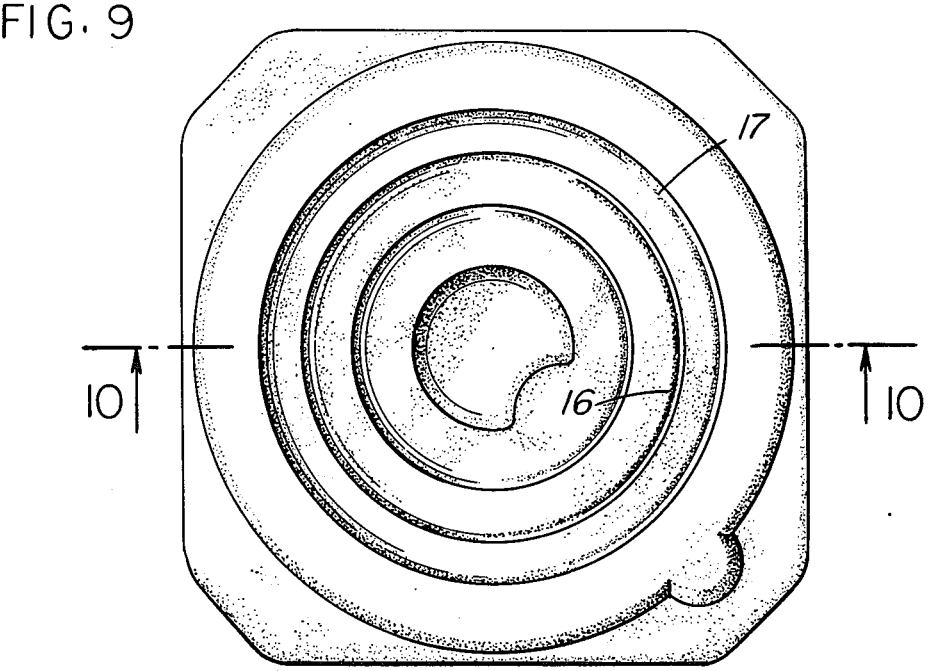
FIG. 10

METHOD OF EMBOSSING FOAM POLYSTYRENE TO PREVENT WARPING UPON REMOVAL FROM MOLD

BACKGROUND OF THE INVENTION

It is known in the prior art that thermoplastic materials such as, for example, polystyrene foam sheet, may be thermoformed into various articles by preheating the sheet to an elevated forming temperature and thereafter deforming the preheated sheet to the desired configuration utilizing a pair of matched metal molds. Articles which have been formed utilizing such a technique include, for example, foam egg cartons, meat trays, produce containers, disposable table-wear items and the like. Such items are characterized by having structural features which include surrounding upstanding-wall member elements which are integral with the base of the item, and such items show little or no tendency to curl or warp following their removal from the thermoforming mold. However, it has been found that when relatively flat articles, which are devoid of surrounding upstanding wall elements, are thermoformed utilizing the above-described procedure there is a tendency for such articles to bend or curl upon removal from the thermoforming mold resulting in, not the desired flat structure when the longitudinal and transverse axis of the article lie substantially in the same plane, but rather an article which has a pronounced curve or bow. It has been found that regulation and control of the thermoforming process conditions, such as preheat and forming temperatures, forming pressures, and residence time in the forming mold do not remedy the undesirable bending or blowing effect assumed by the article when it is removed from the mold.

In accordance with the present invention, a method and apparatus are provided which allow for the formation of flat surfaces on products such as thermoplastic foam structures which have been thermoformed. The method includes controlling the cross section and surface area of the foam part being formed in such a manner as to produce parts or details of parts made from foam sheets which are flat.

SUMMARY OF THE INVENTION

The present invention provides a method and apparatus for thermoforming thermoplastic foam articles which comprises initially preheating a relatively flat sheet of foam to its thermoforming temperature. Next, the preheated sheet is brought into pressure engagement between a pair of molding elements wherein the preheated foam sheet is molded into the desired configuration. During the molding operation, at least two spaced-apart parallel grooves are formed on one surface of the of the molded article. Preferably, the grooves extend the full length of the article. The parallel grooves may assume a linear parallel direction or may be parallel in the sense that they are concentric circles.

BRIEF DESCRIPTION OF THE DRAWINGS

FIG. 9 is a planar view of the bottom of the support structure illustrated in FIG. 8.

FIG. 10 is a cross-sectional view taken on line 10—10 of FIG. 9.

DESCRIPTION OF SPECIFIC EMBODIMENTS

Figure 1:
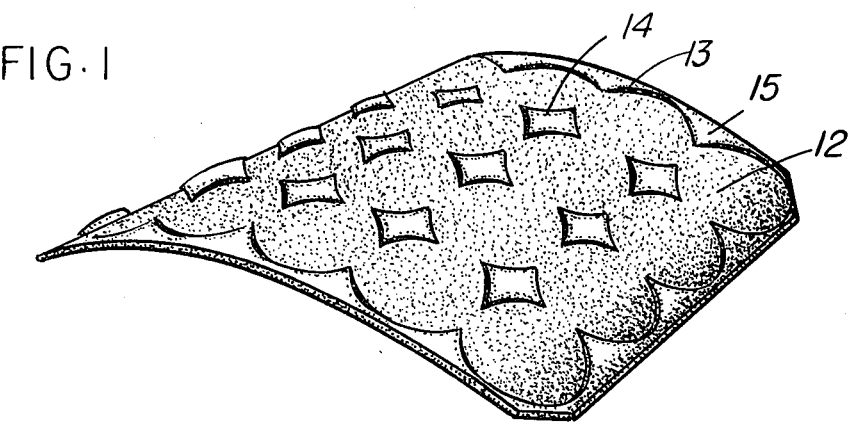
FIG. 1 is a schematic perspective view of a packaging pad, thermoformed utilizing prior art thermoforming techniques.

A typical embodiment of a specific thermoformed article, which may be formed from thermoplastic foam in accordance with the present invention includes packing pads which are flat, rigid or semi-rigid, supports used to support a plurality of articles, the entire assembly being overwrapped with packaging materials such as transparent thermoplastic film. Such a packaging construction may be employed for the packaging of a plurality of goods such as canned goods and including canned beverages. The cans are placed on the flat support pad and the entire assembly is overwrapped with a packaging film such as, for example, a polyolefin film such as polyethylene. In such a packaging application it is of prime importance that the support pad be absolutely flat to insure proper placement of the objects on the pad as well as package stability during and after the film overwrap operation. FIG. 1 illustrates one form of such a packaging pad which has been formed utilizing prior art thermoforming techniques. It will be noted that the pad has a pronounced curvature in a direction corresponding to the long dimension of the pad, which in turn corresponds to the machine direction (direction of extrusion) of the base foam material employed to produce this pad. It will be noted that one surface of the thermoformed pad, i.e. that surface which is intended to be in contact with the individual cans supported thereon is characterized by having a plurality of substantially round areas 12 which are partially defined by discontinuous raised ridge members 13. Ridge members 13 are designed so as to engage and hold in position the lower circular chime on the can which it is adjacent to. The upper portion 15 of ridge member 13 extend along opposite longitudinal edges of the pad forming a somewhat scalloped configuration. Raised diamond shaped elements 14 characterized by having concave sides to accommodate a portion of the individual can chimes are uniformly arranged in a plurality of longitudinal and traverse rows and are positioned so that they are surrounded on all sides by a portion of the circular chime of individual cans, four cans being positioned around each of the rasied elements 14.

The prior art tray, as illustrated in FIG. 1, obviously may not be used to effectively package can members as a result of the pronounced longitudinal curvature thereof. In addition to the attendant difficulties of proper positioning and spacing of the individual cans, the difficulties which would be encountered in overwrapping cans placed on such a support and finally the non-stability of the finished package by virtue of the curvature of the support pad renders such structures totally unacceptable for packaging applications.

Figure 2:
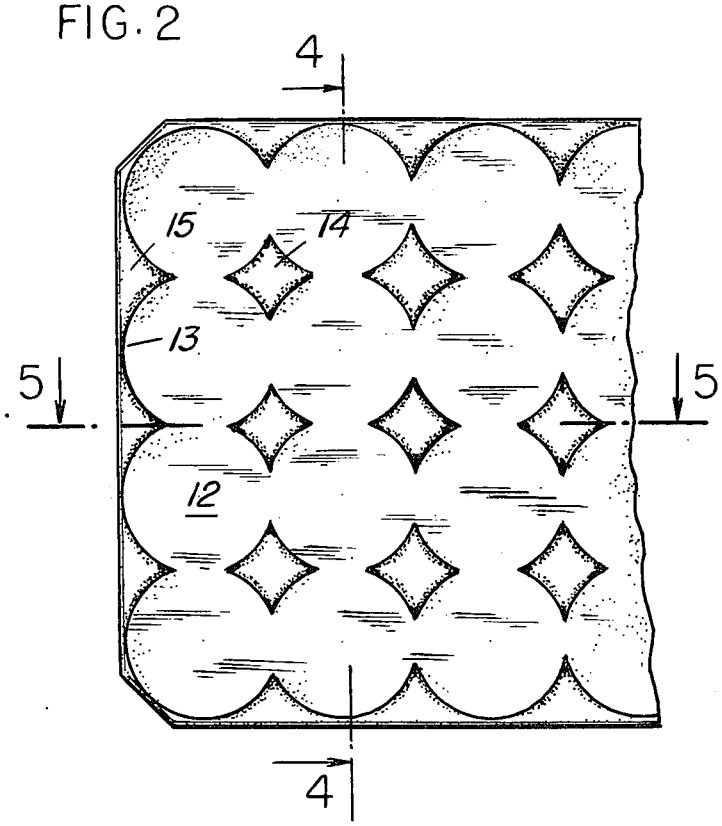
FIG. 2 is a fragmentary planar view of the top surface of a packaging pad formed in accordance with the present invention.
Figure 3:
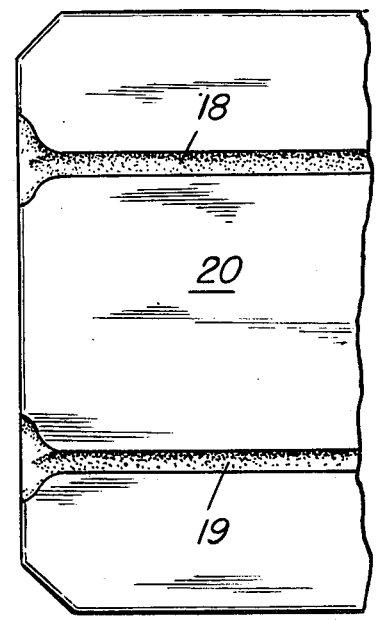
FIG. 3 is a fragmentary planar view of the bottom of the packaging pad illustrated in FIG. 2.
Figure 4:
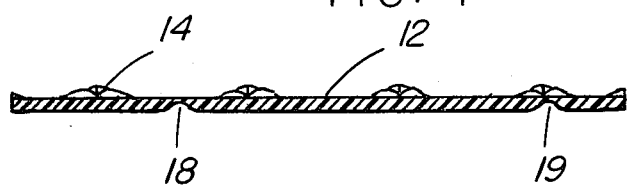
FIG. 4 is a cross-sectional view taken on line 4—4 of FIG. 2.
Figure 5:
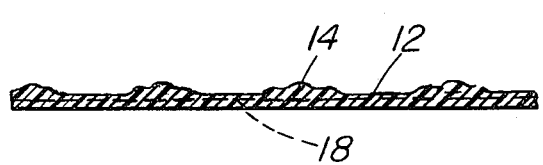
FIG. 5 is a cross-sectional view taken on line 5—5 of FIG. 2.

A support packaging pad in accordance with the present invention is illustrated in FIGS. 2 through 5 inclusive, As constrasted with the prior art pad of FIG. 1, it will be noted that the support pad of FIG. 2 is substantially completely flat, even though the preheat and thermoforming temperatures, forming pressures, and over-all processing conditions which were utilized to form the support pad of FIG. 1 were also utilized to form the support pad of FIG. 2. However, in the case of the support pad of FIG. 2, during the thermoforming step, a pair of substantially continuous parallel grooves 18 and 19 which extend full length of the pad were formed in the underside surface 20 of the pad as shown in FIGS. 3, 4 and 5. It was surprisingly found that by forming such grooves in the under-surface of the support pad of the present invention, the pad following removal from the mold, does not bow and warp but remains in a desirably flat condition. Although the reasons for this are not fully understood, it has been theorized that these pads are formed by embossing one surface thereof, the resultant increasse in the surface area on one side of the pad may set up stresses within the pad which causes it to curve or bend. It may be that these forces are counter-acted by increasing the surface area on the opposite side of the pad in accordance with the present invention by the formation therein of spaced-apart continuous grooves. However, it will be understood that such theory should mot be construed in any sense as limitative of the present invention. The following examples are presented as illustrations of the forming technique employed to produce specific embodiments of structures in accordance with the present invention and, therefore, are not to be considered in a limiting sense.

EXAMPLE I

Polystyrene foam sheet produced in accordance with the method disclosed in U.S. Pat. No. 3,444,283, the disclosure of which is incorporated herein by reference, was used as stock material for the formation of a packaging pad. A polystyrene foam sheet approximately 70 mils thick was passed through a preheat oven wherein it was preheated to a temperature of about 170°–250° F. The preheated polystyrene sheet was passed to a molding station. The mold used was fabricated from an aluminum alloy allowing ease of machining to close tolerances to the required shapes. The surface of one of the mold elements was configured so as to impress a plurality of circular areas 12 onto one face of the foam stock, as shown in FIG. 1. The opposing mold element was completely flat so as to cause the opposite surface of the sheet being formed to be substantially planar. Upon removal of the formed packaging pad from the mold, the pad had a pronounced curvature in the direction corresponding to the machine direction (i.e. direction of extrusion of the foam stock) of the foam so that the thermoformed pad had a radius of curvature along its length of from about 12 to 18 inches. The packaging pad resembled the pad shown in FIG. 1 and was completely unsuitable as a packaging support in overwrap packaging operations because of its curved configuration.

EXAMPLE II

The procedure of Example I was followed to fabricate a packaging pad with the exception that the substantially flat mold element employed in Example I was modified by positioning on the surface thereof spaced apart metallic rods whereby the thermoformed packaging pad, following the molding operation, had one side thereof which was characterized by having a pair of parallel spaced apart, longitudinal grooves, each of the grooves being about one-eighth inch wide and about one-eighth inch in depth. The foam pad, following its removal from the mold was substantially flat, as shown in FIGS. 2 through 5 inclusive. The pad was ideally suited as a support member for employment in the over-wrapped packaging of canned goods, for example. The finished pad was approximately 200 mils thick and the depth of the circular embossments 12 on one surface of the pad was approximately 50 mils. The polystyrene foam sheet employed to produce the pad had a foam basis weught of about 20 grams per 100 square inches.

Figure 6:
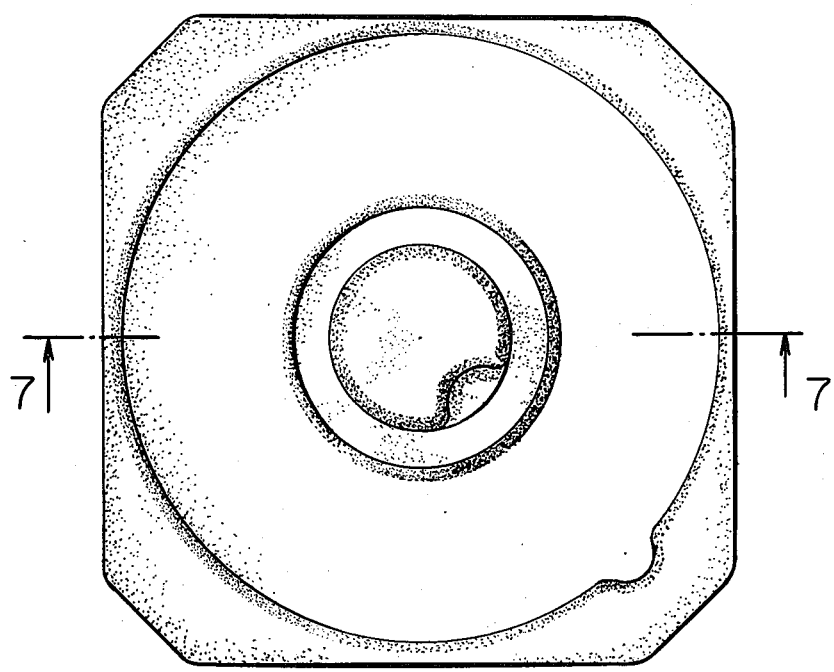
FIG. 6 is an overhead planar view of a support structure for a computer tape reel thermoformed utilizing prior art thermoforming techniques.
Figure 7:
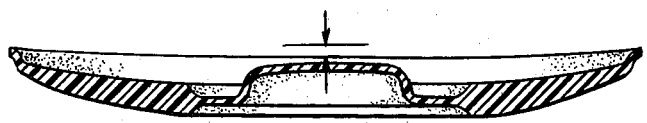
FIG. 7 is a cross-sectional view taken on line 7—7 of FIG. 6.
Figure 8:
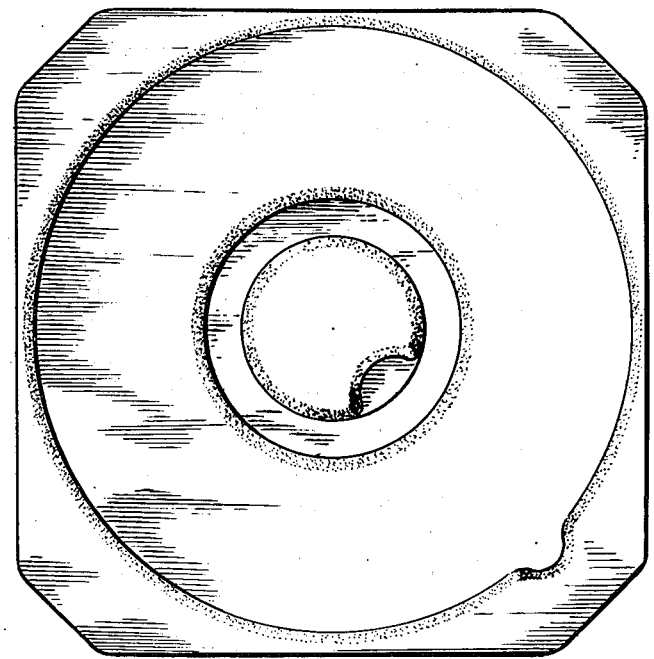
FIG. 8 is an overhead planar view of a support structure for a computer tape reel formed in accordance with the present invention.

FIGS. 6 through 10 inclusive illustrate still another specific embodiment of the containers and container support structures of the present invention. Specifically, there is shown in FIGS. 6 and 7 a support structure adapted for the packaging of an object such as a computer tape. It will be seen from the non-planar or bowed configuration of the computer tape support, particularly illustrated in FIG. 7 obvious difficulties will be encountered when attempting to seat the flat computer tape reel on such a structure. The computer tape support member illustrated in FIGS. 6 and 7 was formed utilizing the prior art thermoforming process as described in Example I. FIGS. 8 through 10 illustrates a computer tape support member, similar to the structure shown in FIGS. 6 and 7 with the exception of particular structural modifications which resulted in the formed foam piece being substantially flat when it was removed from the thermoforming mold. In particular, as shown in FIG. 9, the under surface (i.e. side which is out of contact with the object being supported) has formed therein two spaced-apart grooves 16 and 17 which are in the form of concentric rings and which are impressed only into the under surface of the tape support structure. The article shown in FIGS. 8 through 10 was formed in accordance with the procedure outline in Example II with the obvious exception of the mold element configurations. The specific dimensions of the structure shown in FIG. 4 include an overall square shape of 11 inches on each side, circular groove 16 has a diameter of about 6 inches while circle groove 17 had a diameter of about 8 inches. Groove 16 and 17 are about one-eighth inches wide and one-eighth inches deep.

Although the preceeding invention has been described with reference to specific embodiments, such embodiments should not be construed in a limiting sense, the scope of the present invention being defined in the following claims.

What is claimed is:

1. In a method of thermoforming a flat foam polystyrene sheet to make a substantially flat article free from integral upstanding wall elements by preheating a flat polystyrene sheet and embossing one side said sheet by pressing said sheet between a pair of mold members, the improvement to eliminate warpage of said article upon removal of said article from said mold members, comprising: forming, by surface embossing at least two spaced apart parallel grooves in a surface of a second side only of the preheated said sheet.

2. A method in accordance with claim 1 wherein said parallel grooves extend substantially the complete length of said formed article.

3. A method in accordance with claim 1 wherein said parallel grooves are in the form of concentric circles.

* * * * *